Patented Nov. 11, 1947

2,430,735

UNITED STATES PATENT OFFICE 2,430,735

CATALYTIC CONVERSION OF HYDROCARBONS

Frederick E. Ray, Mantua, Russell Lee, Wenonah, N. J., and Jacob R. Meadow, Memphis, Tenn., assignors to Socony-Vacuum Oil Company, Incorporated, a corporation of New York No Drawing. Application November 29, 1944, Serial No. 565,786

9 Claims. (Cl. 196—52)

This invention relates to processes for conversion of hydrocarbons wherein the vapors of a hydrocarbon charge stock are contacted at conversion conditions of temperature and pressure with a solid adsorbent conversion catalyst containing silica and an oxide of a metal which is difficult to reduce, for example, alumina, beryllia, zirconia, titania and the like. More specifically the invention is concerned, in certain preferred embodiments, with a process of that type in which a catalyst which has suffered serious deterioration of activity is reactivated by a novel method of treatment thereinafter described.

Processes of catalytic conversion of the type to which this invention pertains are well known in the art. Outstanding examples are catalytic cracking and catalytic reforming, usually on silica-alumina, although composites of silica with a difficultly reducible metal oxide in general have been shown to be active. Catalytic cracking on silica-alumina composites may be taken as typical for purposes of showing the objects and advantages of the invention.

In processes of catalytic cracking, a composite of the class defined above, e. g., a porous adsorbent clay or synthetic composite of silica and alumina, is contacted with hydrocarbon vapors at conversion conditions, say, 800 to 1000° F. at atmospheric or greater pressure. The reaction which takes place is essentially a cracking to produce lighter hydrocarbons but is accompanied by a number of complex side reactions such as aromatization, polymerization, alkylation, etc. As a result of these complex reactions, a carbonaceous deposit is laid down on the catalyst which is commonly called "coke," although it contains considerable hydrogen and is probably a highly condensed hydrocarbon. The coke tends to seriously impair the catalytic efficiency of the catalyst for the principal reaction and the conversion reaction is therefore suspended after coke, to the extent of a few per cent by weight of catalyst, has accumulated on the catalyst. The catalytic surface is then regenerated by burning the coke in a stream of oxidizing gas and the catalyst is returned to the conversion stage of the cycle.

The catalyst also undergoes a second type of degeneration by reason of changes in the catalyst itself, as contrasted with the masking of catalytic surfaces by a coke deposit. As the catalyst is carried through a large number of cycles of alternate conversion and regeneration, the activity following each regeneration becomes progressively less until the activity is too low for economical use of the catalyst. These two types of degeneration differ in the time factor as well as in the nature of the change occurring. Coke deposition, which will be hereinafter called "contamination", is fairly rapid, it being desirable to remove the coke by burning after about 10 to 20 minutes on stream. This burning of the coke will be hereinafter designated as "regeneration." On the other hand, the change in basic nature of the catalyst, resulting in lowered activity after regeneration, is a slow change. A catalyst may be in service for over a year of thirty minute cycles before becoming so degenerated as to require replacement. For example, a year or more may elapse before a catalyst in continuous service drops from an initial activity of 45, as hereinafter defined, to 25 or 30. This slow degeneration will be referred to herein as "deactivation" to distinguish it from "contamination."

It is the primary object of this invention to return a deactivated catalyst to a higher activity level by contacting a hydrocarbon vapor containing organic fluorides with the deactivated catalyst under conversion conditions of temperature and pressure. Processes of this nature wherein the organic fluorides result from treatment of the charge stock with hydrogen fluoride are claimed in the copending application of Jacob R. Meadow, Serial No. 565,785, filed November 29, 1944. This treatment of the catalyst to raise the activity will be designated "reactivation" to avoid confusion with "regeneration" by burning of a combustible deposit.

The nature of the deactivation is not understood and it is, therefore, impossible to afford a clear explanation of reactivation as practiced according to this invention. It has been noted that X-ray diffraction patterns show crystalline matter in catalyst deactivated by aging and it may be that high catalytic activity is associated with the amorphous state. On that assumption, it may be postulated that reactivation with alkyl fluoride causes reversion of crystalline matter to an amorphous form which is more active. However, it may also be suggested that the reactivation is due, not to a return of the catalyst to its original form, but to formation of active compounds such as aluminum fluoride, silicon tetrafluoride which reacts with aluminum oxide to form a non-volatile complex, or the like. If that be the true explanation, the reactivation is, in effect, the conversion of deactivated catalyst to a new composition of matter differing in chemical nature from but similar in activity to the original catalyst.

The invention is, of course, not limited to any theory of operation, but it is believed that the effects obtained are due to the presence in the conversion zone of nascent hydrogen fluoride form by catalytic decomposition of the organic fluorides. Effects of somewhat the same general nature may be obtained by the use of hydrogen fluoride gas, but this appears to be undesirable in that hydrogen fluoride so introduced is less effective when used in amounts and under conditions to avoid substantial decomposition of the catalyst. It appears that small amounts of nascent hydrogen fluoride, if that be the active principal, are vastly superior to hydrogen fluoride introduced as such.

The amount of organic fluoride introduced according to the present invention should be kept relatively low. In general, less than 1% by weight based on total vapor charge of fluorine in the form of organic fluoride is preferred. Larger amounts up to about 3% may be used, but without marked advantage. When still larger amounts of fluorides are present, the treatment tends to cause serious damage to the catalyst. The preferred procedure is to conduct the fluoride containing vapor over the catalyst in the same manner and under the same conditions as those employed for conducting the principal reaction. Preferably, the treatment is made in a plurality of cycles with a hydrocarbon fraction containing a very small amount of fluorides; for example, up to about 0.3% fluorine by weight. It is to be understood that use of the term "cycle" in the specification is not intended to refer only to fixed bed operation wherein hydrocarbons and regeneration air are alternately passed through a stationary mass of catalyst. Continuous operations in which the catalyst passes alternately through a reaction zone for contact with charge and a regeneration zone are well adapted to the purposes of the invention. In the latter case, a cycle indicates the average interval required for catalyst to complete the circuit through reactor and regenerator. Fixed bed runs reflect the advantages of the invention more accurately since each catalyst particle is contacted in the same manner during successive cycles, and the results reported herein are of that type.

The ratio between the time a catalyst may be employed for cracking and the time spent in regeneration is a function of the rate of coke formation. Thus a catalyst which forms twice as much coke is actually only half as efficient as the standard, although both catalysts may have the same "activity" as measured by percent conversion of gas oil to gasoline. One of the important aspects of the invention is the effect on gasoline to coke ratio.

In some instances, the gasoline to coke ratio appears to be adversely affected by extensive treatment for reactivation. In connection with catalysts sensitive to overtreatment, suitable care should be exercised. It is noted that most catalysts do not show such sensitivity under conditions employed so far.

The benefits of the invention are illustrated by a series of cycles in which a catalyst was alternately on stream for conversion of gas oil at 800° F. and atmospheric pressure and in regeneration for burning of coke. During the conversion side of the cycle, oil was supplied at a space velocity of 1.5 volumes of liquid oil per volume of catalyst per hour and one volume of liquid oil was contacted with four volumes of catalyst during each cycle. The catalyst was a synthetic silica-alumina coprecipitate. During certain of the cycles, the charge stock supplied (treated gas oil) was gas oil which had been treated with hydrogen fluoride in liquid phase to separate sulfur and asphaltic compounds while propylene was added during such treatment with hydrogen fluoride to alkylate compounds in the charge susceptible to alkylation.

The yields obtained on "treated gas oil" are not necessarily comparable with each other or with yields on "standard gas oil" because of differences in nature and history of the charge. The significant values are the yields on standard gas oil which is the gas oil cut of Oklahoma City crude. The yield of gasoline from the standard charge is regarded as the index of activity of the catalyst.

Table I below shows the results obtained.

TABLE I

*Activation of fresh catalyst*

| Charge Stock, Description | Flourine Content, Per Cent wt. | No. of Cycles | Cumulative No. of Cycles | Cracking Yields | | | | |
|---|---|---|---|---|---|---|---|---|
| | | | | Gas, Per Cent wt. | Coke, Per Cent wt. | 410° F. E. P. Gasoline, Per Cent vol. | Gasoline to Coke Ratio | Gasoline to Gas Ratio |
| Standard Gas Oil | Nil | 8 | 8 | 6.5 | 2.9 | 43.0 | 14.8:1 | 6.6:1 |
| Treated Gas Oil | 0.19 | 5 | 13 | 11.5 | 4.5 | 38.4 | 8.5:1 | 3.3:1 |
| Do | 0.01 | 7 | 20 | 6.2 | 4.4 | 44.4 | 10.1:1 | 7.2:1 |
| Do | | 5 | 25 | 11.5 | 3.7 | 40.0 | 10.8:1 | 3.5:1 |
| Standard Gas Oil | Nil | 5 | 30 | 5.9 | 3.0 | 46.6 | 15.5:1 | 7.9:1 |
| Treated Gas Oil | 0.11 | 5 | 35 | 12.9 | 3.9 | 41.9 | 10.7:1 | 3.3:1 |
| Do | 0.28 | 4 | 39 | 16.6 | 5.0 | 40.6 | 8.1:1 | 2.4:1 |
| Do | 0.06 | 5 | 44 | 8.7 | 4.5 | 45.4 | 10.1:1 | 5.2:1 |
| Do | 0.01 | 5 | 49 | 7.3 | 4.7 | 47.3 | 10.1:1 | 6.5:1 |
| Standard Gas Oil | Nil | 5 | 54 | 6.5 | 3.4 | 49.7 | 14.6:1 | 7.7:1 |

The above table shows significant increases in activity when a relatively active catalyst is used. The invention may thus be used to activate fresh catalyst. However, the treatment is somewhat drastic when compared to the increase in activity of the catalyst. Catalysts activated according to the present invention show a faster rate of decrease in activity during use than catalysts not so activated, and it is believed that the principal value of the invention is restoration of the activity of the catalyst which has become deactivated over a long period of use. Such deactivated catalyst was used in a series of cycles similar to those of Table I. The catalyst was similar to that of Table I except that it had been in service in a commercial unit for a period of time sufficient to decrease its acitvity to 28.3. The results of this second series are reported in Table II below.

TABLE II
Activation of used catalyst

| Charge Stock, Description | Flourine Content, Per Cent wt. | No. of Cycles | Cumulative No. of Cycles | Cracking Yields | | | | |
|---|---|---|---|---|---|---|---|---|
| | | | | Gas, Per Cent wt. | Coke, Per Cent wt. | 410° F. E. P. Gasoline, Per Cent vol. | Gasoline to Coke Ratio | Gasoline to Gas Ratio |
| Standard Gas Oil | Nil | 3 | 3 | 4.4 | 1.8 | 28.3 | 15.7:1 | 6.4:1 |
| Treated Gas Oil | 0.28 | 5 | 8 | 12.3 | 3.2 | 33.9 | 10.6:1 | 2.8:1 |
| Standard Gas Oil | Nil | 5 | 13 | 5.4 | 2.0 | 37.0 | 18.5:1 | 6.8:1 |
| Treated Gas Oil | 0.28 | 4 | 17 | 14.5 | 3.4 | 38.3 | 11.3:1 | 2.6:1 |
| Standard Gas Oil | Nil | 3 | 20 | 5.2 | 2.0 | 40.3 | 20.1:1 | 7.7:1 |
| Treated Gas Oil | 0.28 | 6 | 26 | 13.5 | 3.3 | 38.9 | 11.8:1 | 2.9:1 |
| Standard Gas Oil | Nil | 7 | 33 | 5.1 | 4.2 | 40.9 | 9.8:1 | 8.0:1 |

Table II illustrates the possibility of overtreating. After the first series with fluoride containing oil, the activity, gasoline to coke ratio and gasoline to gas ratio were all improved to a marked extent. The second series of treatment with fluorides yielded some improvement, but the third series resulted in an overall deterioration of the catalyst. While the activity was slightly increased, the more than 50% reduction in the gasoline to coke ratio is regarded as serious loss in economic value of the catalyst.

To illustrate that the effect obtained is attributable to organic fluorides in the charge stock, a series was run using a gas oil in which a small amount of propyl fluoride had been dissolved. The results appear in Table III below.

TABLE III
Activation of fresh catalyst

| Charge Stock, Description | Flourine Content, Per Cent wt. | No. of Cycles | Cumulative No. of Cycles | Cracking Yields | | | | |
|---|---|---|---|---|---|---|---|---|
| | | | | Gas, Per Cent wt. | Coke, Per Cent wt. | 410° F. E. P. Gasoline, Per Cent vol. | Gasoline to Coke Ratio | Gasoline to Gas Ratio |
| Standard Gas Oil | Nil | 5 | 5 | 6.5 | 2.9 | 43.0 | 14.8:1 | 6.6:1 |
| Treated Gas Oil | 0.29 | 5 | 10 | 14.8 | 4.5 | 47.4 | 10.5:1 | 3.2:1 |
| Standard Gas Oil | Nil | 4 | 14 | 7.7 | 3.2 | 48.0 | 15.0:1 | 6.2:1 |

Tables IV, V, VI, and VII below show further the effect of organic fluorides on cracking catalysts. The "bead catalyst" of Table IV was prepared according to the disclosure of Patent No. 2,385,217, dated September 18, 1945, to Milton M. Marisic. That process involves injecting a gelable silica-alumina sol into a body of oil in which globules of the sol assume spherical shape and set to firm spheroids which are then washed and dried to hard glassy beads of catalyst. The natures of the catalysts of the other tables are sufficiently indicated in the tables.

TABLE IV
Activation of fresh and used synthetic bead catalyst

| Charge Stock, Description | Fluorine Content, Per Cent wt. | No. of Cycles | Cumulative No. of Cycles | Cracking Data [1] | | | | |
|---|---|---|---|---|---|---|---|---|
| | | | | Gas, Per Cent wt. | Coke, Per cent wt. | 410° F. E. P. Gasoline, Per Cent vol. | Gasoline to Coke Ratio | Gasoline to Gas Ratio |
| FRESH BEAD CATALYST | | | | | | | | |
| Standard Gas Oil (a) | Nil | 3 | 3 | 7.0 | 3.2 | 45.3 | 14.2 | 6.5 |
| Naphtha plus Isopropyl Fluoride (b) | 0.12 | 1 | 4 | | | | | |
| Standard Gas Oil (a) | Nil | 5 | 9 | 6.4 | 3.8 | 50.4 | 13.2 | 7.9 |
| USED BEAD CATALYST | | | | | | | | |
| Standard Gas Oil (a) | Nil | 5 | 5 | 6.0 | 2.7 | 39.8 | 14.7 | 6.6 |
| Standard Gas Oil plus Isopropyl Fluoride (a) | 0.1 to 0.2 | 5 | 10 | 8.8 | 3.3 | 48.5 | 14.7 | 5.5 |
| Standard Gas Oil (a) | Nil | 5 | 15 | 6.1 | 3.2 | 46.4 | 14.5 | 7.6 |
| Standard Gas Oil plus Isopropyl Fluoride (a) | 0.1 to 0.2 | 5 | 20 | 9.6 | 4.0 | 49.2 | 12.3 | 5.1 |
| Standard Gas Oil (a) | Nil | 4 | 24 | 6.5 | 3.4 | 47.9 | 14.1 | 7.4 |

[1] Cracking Conditions:

| | Runs Marked | |
|---|---|---|
| | a | b |
| Temp., ° F | 800 | 800 |
| Space Velocity, V./V./hr | 1.5 | 3.0 |
| Catalyst to Oil Ratio, vol | 4:1 | 1:1 |
| Pressure, P. S. I. G | 0 | 0 |
| Steam | None | None |

TABLE V

*Activation of fresh and used Superfiltrol pellet catalysts*

| Charge Stock, Description | Fluorine Content, Per Cent wt. | No. of Cycles | Cumulative No. of Cycles | Cracking Data [1] | | | | |
|---|---|---|---|---|---|---|---|---|
| | | | | Gas, Per Cent wt. | Coke, Per cent wt. | 410° F. E. P. Gasoline, Per Cent vol. | Gasoline to Coke Ratio | Gasoline to Gas Ratio |
| FRESH SUPERFILTROL PELLET CATALYST | | | | | | | | |
| Standard Gas Oil (a) | Nil | 3 | 3 | 5.3 | 4.1 | 37.1 | 9.1 | 7.0 |
| Naphtha plus Isopropyl Fluoride (b) | 0.12 | 2 | 5 | | 0.9 | | | |
| Standard Gas Oil (a) | Nil | 5 | 10 | 4.7 | 3.5 | 39.6 | 11.3 | 8.4 |
| Naphtha plus Isopropyl Fluoride (b) | 0.12 | 1 | 11 | | 0.8 | | | |
| Standard Gas Oil (a) | Nil | 6 | 17 | 4.8 | *4.0 | 39.4 | 9.9 | 8.2 |
| USED SUPERFILTROL PELLET CATALYST | | | | | | | | |
| Standard Gas Oil (a) | Nil | 5 | 5 | 3.2 | 2.5 | 27.6 | 11.0 | 8.6 |
| Naphtha plus Isopropyl Fluoride (c) | 0.12 | 3 | 8 | | 0.6 | | | |
| Standard Gas Oil (a) | Nil | 5 | 13 | 3.4 | 3.4 | 32.0 | 10.7 | 9.4 |
| Naphtha plus Isopropyl Fluoride (c) | 0.12 | 3 | 21 | | 0.5 | | | |
| Standard Gas Oil (a) | Nil | 3 | 24 | 3.3 | 2.4 | 33.3 | 13.9 | 10.1 |

[1] Cracking Conditions:

| | Runs Marked | | |
|---|---|---|---|
| | a | b | c |
| Temp., °F | 800 | 800 | 800 |
| Space Velocity, V./V./hr | 1.5 | 3.0 | 3.0 |
| Catalyst to Oil Ratio, vol | 4:1 | 2:1 | 1:1 |
| Pressure, P. S. I. G | 0 | 0 | 0 |
| Steam | None | None | None |

TABLE VI

*Activation of fresh fuller's earth pellet catalyst*

| Charge Stock, Description | Fluorine Content, Per Cent wt. | No. of Cycles | Cumulative No. of Cycles | Cracking Data [1] | | | | |
|---|---|---|---|---|---|---|---|---|
| | | | | Gas, Per Cent wt. | Coke, Per cent wt. | 410° F. E. P. Gasoline, Per Cent vol. | Gasoline to Coke Ratio | Gasoline to Gas Ratio |
| Standard Gas Oil (a) | Nil | 4 | 4 | 2.2 | 1.8 | 18.5 | 10.3 | 8.4 |
| Naphtha plus Isopropyl Fluoride (b) | 0.12 | 1 | 5 | | 1.0 | | | |
| Standard Gas Oil (a) | Nil | 3 | 8 | 2.4 | 2.0 | 19.0 | 9.5 | 7.9 |
| Naphtha plus Isopropyl Fluoride (b) | 0.12 | 1 | 9 | | 1.0 | | | |
| Standard Gas Oil (a) | Nil | 4 | 13 | 2.6 | 1.9 | 21.8 | 11.5 | 8.4 |
| Naphtha plus Isopropyl Fluoride (b) | 0.12 | 1 | 14 | | 1.3 | | | |
| Standard Gas Oil (a) | Nil | 3 | 17 | 3.0 | 2.3 | 23.1 | 10.0 | 7.7 |
| Naphtha plus Isopropyl Fluoride (a) | 0.12 | 2 | 19 | | 1.2 | | | |
| Standard Gas Oil (a) | | 4 | 23 | 3.0 | 2.8 | 26.3 | 9.4 | 8.8 |

[1] Cracking Conditions:

| | Runs Marked | |
|---|---|---|
| | a | b |
| Temp., °F | 800 | 800 |
| Space Velocity, V./V./hr | 1.5 | 3.0 |
| Catalyst to Oil Ratio, vol | 4:1 | 1:1 |
| Pressure, P.S.I.G | 0 | 0 |
| Steam | None | None |

TABLE VII

*Effect of steam treatment on cracking activities of catalysts before and after activation as in Tables IV, V and VI [1]*

| Catalyst Sample | No. of Cycles | Cumulative No. of Cycles | Cracking Data [2] | | | | |
|---|---|---|---|---|---|---|---|
| | | | Gas, per cent wt. | Coke, per cent wt. | 410° F.E.P. Gasoline, per cent vol. | Gasoline to Coke Ratio | Gasoline To Gas Ratio |
| Synthetic Pellet Catalyst | 8 | 8 | 6.5 | 2.9 | 43.0 | 14.8 | 6.6 |
| Same, Activated | 5 | 13 | 6.5 | 3.4 | 49.7 | 14.6 | 7.6 |
| Same, Activated, Steam-Treated | 5 | 18 | 2.1 | 1.0 | 28.7 | 28.7 | 13.7 |
| Same, Activated, Steam-Treated, Reactivated | 3 | 21 | 3.0 | 1.4 | 40.8 | 29.1 | 13.6 |
| Same, Steam-Treated | 4 | 25 | 5.3 | 2.4 | 40.3 | 16.8 | 7.6 |
| Used Bead Catalyst | 5 | 5 | 6.0 | 2.7 | 39.8 | 14.7 | 6.6 |
| Same, Activated | 4 | 9 | 6.5 | 3.4 | 47.9 | 14.1 | 7.4 |
| Same, Activated, Steam-Treated | 3 | 12 | 3.7 | 1.5 | 34.8 | 23.2 | 9.4 |
| Same, Steam-Treated | 3 | 15 | 4.6 | 2.3 | 40.0 | 17.4 | 8.7 |
| Fresh Bead Catalyst | 3 | 3 | 7.0 | 3.2 | 45.3 | 14.2 | 6.5 |
| Same, Activated | 6 | 9 | 7.1 | 3.9 | 49.8 | 12.8 | 7.0 |
| Same, Activated, Steam-Treated | 5 | 14 | 4.1 | 1.8 | 39.3 | 21.8 | 9.6 |
| Same, Steam-Treated | 3 | 17 | 5.8 | 2.5 | 44.1 | 17.6 | 7.6 |
| Fresh Superfiltrol Pellet Catalyst | 3 | 3 | 5.3 | 4.1 | 37.1 | 9.1 | 7.0 |
| Same, Activated | 6 | 9 | 4.8 | 4.0 | 39.4 | 9.9 | 8.2 |
| Same, Activated, Steam-Treated | 3 | 12 | 3.9 | 3.2 | 35.6 | 12.3 | 10.1 |
| Same, Steam-Treated | 3 | 15 | 4.6 | 3.2 | 38.1 | 11.9 | 8.3 |

[1] All steam treatments made using 10% steam at 1425° F. for 5 hours.
[2] Cracking Conditions:
  Charge Stock—Standard Gas Oil (Oklahoma City).
  Temp., °F ---- 800
  Space velocity, V./V. hr. ---- 1.5
  Catalyst to oil ratio, vol. ---- 4:1
  Pressure, P. S. I. G. ---- 0
  Steam ---- None Particular attention is called to the fact that steam treatment of activated synthetic catalysts results in outstanding gasoline to coke and gasoline to gas ratios.

We claim:

1. In a process for conversion of hydrocarbons wherein hydrocarbon vapors are contacted with a solid porous catalyst containing silica and alumina for a predetermined period of time to convert said hydrocarbons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactivated to a substantial extent by effects other than said combustible deposit as evidenced by the fact that burning regeneration of the catalyst after a series of cycles regenerates the catalyst to an activity as measured by per cent conversion of said hydrocarbons lower than the activity of the catalyst at the beginning of said series; the improvement which comprises contacting said catalyst in at least one cycle with a hydrocarbon vapor containing a small amount, not more than about 3% by weight, of organic fluorides and after contacting said catalyst with said fluoride containing vapor, again contacting hydrocarbon vapor substantially free of fluorides with said catalysts.

2. In a process for conversion of hydrocarbons wherein hydrocarbon vapors are contacted with a solid porous catalyst containing silica and alumina for a predetermined period of time to convert said hydrocarbons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactivated to a substantial extent by effects other than said combustible deposit as evidenced by the fact that burning regeneration of the catalyst after a series of cycles regenerates the catalyst to an activity as measured by per cent conversion of said hydrocarbons lower than the activity of the catalyst at the beginning of said series; the improvement which comprises contacting said catalyst in at least one cycle with hydrocarbon vapor containing a small amount, not more than about 3% by weight, of organic fluorides, thereafter contacting said catalyst with steam to thereby improve the gasoline to coke and gasoline to gas ratios, and after contacting said catalyst with said fluoride containing vapor and said steam, again contacting hydrocarbon vapor substantially free of fluorides with said catalyst.

3. In a process for conversion of hydrocarbons wherein hydrocarbon vapors are contacted with a solid porous catalyst containing silica and alumina for a predetermined period of time to convert said hydrocarbons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactivated to a substantial extent by effects other than said combustible deposit as evidenced by the fact that burning regeneration of the catalyst after a series of cycles regenerates the catalyst to an activity as measured by per cent conversion of said hydrocarbons lower than the activity of the catalyst at the beginning of said series; the improvement which comprises contacting said catalyst in at least one cycle with a hydrocarbon vapor containing a small amount, not more than about 3% by weight, of proypl fluoride and after contacting said catalyst with said fluoride containing vapor, again contacting hydrocarbon vapor substantially free of fluorides with said catalyst.

4. In a process for conversion of hydrocarbons wherein hydrocarbon vapors are contacted with a solid porous catalyst containing silica and alumina for a predetermined period of time to convert said hydrocarbons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactivated to a substantial extent by effects other than said combustible deposit as evidenced by the fact that burning regeneration of the catalyst after a series of cycles regenerates the catalyst to an activity as measured by per cent conversion of said hydrocarbons lower than the activity of catalyst at the beginning of said series; the improvement which comprises contacting said catalyst in at least one cycle with a hydrocarbon vapor containing a small amount, not more than about 1% by weight, of organic fluorides and after contacting said catalyst with said fluoride containing vapor, again contacting hydrocarbon vapor substantially free of fluorides with said catalyst.

5. In a process for conversion of hydrocarbons wherein hydrocarbon vapors are contacted with a solid porous catalyst containing silica and alumina for a predetermined period of time to convert said hydrocarbons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactiviated to a substantial extent by effects other than said combustible deposit as evidenced by the fact that burning regeneration of the catalyst after a series of cycles regenerates the catalyst to an activity as measured by per cent conversion of said hydrocarbons lower than the activity of the catalyst at the beginning of said series; the improvement which comprises contacting said catalyst in at least one cycle with hydrocarbon vapor containing a small amount, not more than about 1% by weight, of organic fluorides, thereafter contacting said catalyst with steam to thereby improve the gasoline to coke and gasoline to gas ratios, and after contacting said catalyst with said fluoride containing vapor and steam, again contacting hydrocarbon vapor substantially free of fluorides with said catalyst as aforesaid.

6. In a process for conversion of hydrocarbons wherein hydrocarbon vapors are contacted with a solid porous catalyst containing silica and alumina for a predetermined period of time to convert said hydrocarbons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactivated to a substantial extent by effects other than said combustible deposit as evidenced by the fact that burning regeneration of the catalyst after a series of cycles regenerates the catalyst to an activity as measured by per cent conversion of said hydrocarbons lower than the activity of the catalyst at the beginning of said series; the improvement which comprises contacting said catalyst in at least one cycle with a hydrocarbon vapor containing a small amount, not more than about 1% by weight, of propyl fluoride, and after contacting said catalyst with said fluoride containing vapor, again contacting hydrocarbon vapor substantially free of fluorides with said catalyst.

7. In a process for conversion of hydrocarbons wherein hydrocarbon vapors are contacted with a solid porous catalyst containing silica and a difficultly reducible metal oxide for a predetermined period of time to convert said hydrobons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactivated to a substantial extent by effects other than said combustible deposit as evidenced by the fact that burning regeneration of the catalyst after a series of cycles regenerated the catalyst to an activity as measured by per cent conversion of said hydrocarbons lower than the activity of catalyst at the beginning of said series; the improvement which comprises contacting said catalyst in a plurality of cycles with a hydrocarbon vapor containing a small amount, not more than about 0.3% by weight, of organic fluorides and after contacting said catalyst with said fluoride containing vapor, again contacting hydrocarbon vapor substantially free of fluorides with said catalyst.

8. In a process for conversion of hydrocarbons wherein hydrocarbon vapors are contacted with a solid porous catalyst containing silica and a difficultly reducible metal oxide for a predetermined period of time to convert said hydrocarbons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactivated to a substantial extent by effects other than said combustible deposit as evidenced by the fact that burning regeneration of the catalyst after a series of cycles regenerates the catalyst to an activity as measured by per cent conversion of said hydrocarbons lower than the activity of the catalyst at the beginning of said series; the improvement which comprises contacting said catalyst in a plurality of cycles with hydrocarbon vapor containing a small amount, not more than about 0.3% by weight, of organic fluorides, thereafter contacting said catalyst with steam to thereby improve the gasoline to coke and gasoline to gas ratios, and after contacting said catalyst with said fluoride containing vapor and steam, again contacting hydrocarbon vapor substantially free of fluorides with said catalyst as aforesaid.

9. In a process for conversion of hydrocarbons wherein hydrocarbon vapors are contacted with a solid porous catalyst containing silica and a difficultly reducible metal oxide for a predetermined period of time to convert said hydrocarbons with concurrent deposition of a combustible deposit on the catalyst which substantially lowers the catalytic efficiency thereof, followed by burning regeneration of the catalyst and return of the catalyst to conversion of hydrocarbons thus completing a cycle of operation which is repeated until the catalyst is deactivated to a substantial extent by effects other than said combustible deposit as evidenced by the fact that burning regeneration of the catalyst after a series of cycles regenerates the catalyst to an activity as measured by per cent conversion of said hydrocarbons lower than the activity of the catalyst at the beginning of said series; the improvement which comprises contacting said catalyst in a plurality of cycles with a hydrocarbon vapor containing a small amount, not more than about 0.3% by weight, of propyl fluoride, and after contacting said catalyst with said fluoride containing vapor, again contacting hydrocarbon vapor substantially free of fluorides with said catalyst.

FREDERICK E. RAY.
RUSSELL LEE.
JACOB R. MEADOW.

REFERENCES CITED

The following references are of record in the file of this patent:

UNITED STATES PATENTS

| Number | Name | Date |
| --- | --- | --- |
| 2,309,137 | Peterkin | Jan. 26, 1943 |
| 2,310,317 | Roberts | Feb. 9, 1943 |
| 2,336,165 | Connolly | Dec. 7, 1943 |
| 2,337,640 | Burgin | Dec. 28, 1943 |
| 2,350,159 | Folkins et al. | May 30, 1944 |
| 2,371,341 | Matuszak | Mar. 13, 1945 |
| 2,310,327 | Sweeney | Feb. 9, 1943 |
| 2,372,320 | Frey | Mar. 27, 1945 |
| 2,378,763 | Frey | June 19, 1945 |
| 2,387,309 | Sweeney | Oct. 23, 1945 |

OTHER REFERENCES

Grosse and Linn, "The Addition of Hydrogen Fluoride to the Double Bond," Jour. of Organic Chemistry, vol. III, 1938, pages 26–32. (Copy in Pat. Off. Lib.)